United States Patent
Huang et al.

[11] Patent Number: 5,898,496
[45] Date of Patent: Apr. 27, 1999

[54] OPTICAL SIGNAL NOISE REDUCTION FOR FIBER OPTIC GYROSCOPSES

[76] Inventors: Sidney Xi-Yi Huang, 77 Kaufman Dr., Westwood, N.J. 07675; Naveen Sarma, 299 Union Ave., #6, Rutherford, N.J. 07070; Kevin Mark Killian, 23 Whitman Pl., Hillsdale, N.J. 07642; James Edward Goodwin, 113 Maple St., Ramsey, N.J. 07446

[21] Appl. No.: 08/800,944

[22] Filed: Feb. 14, 1997

[51] Int. Cl.$^6$ .................................................. G01C 9/12
[52] U.S. Cl. ............................................................ 356/350
[58] Field of Search ................................... 356/350, 345, 356/361; 385/12, 14; 250/227.19, 227.27

[56] References Cited

U.S. PATENT DOCUMENTS

| | | | |
|---|---|---|---|
| 4,529,313 | 7/1985 | Petermann et al. | 356/350 |
| 5,245,407 | 9/1993 | Nishiura et al. | 356/350 |
| 5,335,064 | 8/1994 | Nishiura et al. | 356/350 |

OTHER PUBLICATIONS

K. Iwatsuki; Excess Noise Reduction in Fiber Gyroscope Using Broader Spectrum Linewidth Er–Doped Superfluorescent Fiber Laser; IEEE Photonics Technology Letters ; ; vol. 3, No. 3 Mar. 1991; pp. 281–283.

Aileen M. Yurek, et al.; Quantum Noise in Superluminescent Diodes; IEEE Journal of Quantum Electronics; vol. QE–22, No. 4; Apr. 1986; pp. 522–527.

Henry F. Taylor; Intensity Noise and Spontaneous Emission Coupling in Superluminescent Light Sources; IEEE Journal of Quantum Electronics, vol. 26, No. 1; Jan. 1990; pp. 94–97.

R. P. Moeller et al.; 1.06–$\mu$m all–fiber gyroscope with noise subtraction; Reprint from Optics Letters; vol. 16, Jul. 24, 1991; Dec. 1, 1991; pp. 1902–1904.

*Primary Examiner*—Samuel A. Turner
*Attorney, Agent, or Firm*—Verne E. Kreger, Jr.

[57] ABSTRACT

The RIN (random intensity noise) component of the random walk error of a fiber optic gyroscope can be reduced by utilizing an unpolarized light signal during processing. By depolarizing the light wave modulated by the fiber optic sensing coil or combining it with the unmodulated light wave of orthogonal polarization, a 3 db reduction in RIN can be achieved.

12 Claims, 4 Drawing Sheets

OPTICAL SIGNAL NOISE REDUCTION FOR FIBER OPTIC GYROSCOPSES

BACKGROUND OF THE INVENTION

This invention relates generally to fiber optic gyroscopes of the kind discussed at length in U.S. Pat. No. 5,278,631, issued Jan. 11, 1994, to Hollinger et al., for a Closed Loop Fiber Optic Gyroscope with Signal Processing Arrangement for Improved Performance; U.S. Pat. No. 5,280,339 issued Jan. 18, 1994, to Hollinger et al., for a Closed Loop Fiber Optic Gyroscope with Fine Angle Resolution; U.S. Pat. No. 5,309,220, issued May 3, 1994, to Hollinger et al., for a Closed Loop Fiber Optic Gyroscope with Reduced Sensitivity to Electronic Drift; and U.S. Pat. No. 5,504,580 issued Apr. 2, 1996, to Hollinger et al., for a Tuned Integrated Optic Modulator on a Fiber Optic Gyroscope; all of which are incorporated herein by reference. More particularly, it relates to a scheme for increasing the sensitivity of an interferometric fiber optic gyroscope.

The sensitivity of an interferometric fiber optic gyroscope can be expressed as a function of the random walk coefficient of noise. A significant component of the random walk coefficient is the relative intensity noise (RIN). Noise in general can be described as the mean square fluctuations $<\Delta n^2>$ in the number of photoelectrons n emitted from a photodetector illuminated over an area A during an observation time $\tau$. In the case of emission caused by polarized broadband light incident upon the photodetector, $$<\Delta n^2> = <n> + <n>^2 \tag{1}$$

This equation holds true where the illumination area A is less than the coherence area $A_c$ of the source and the observation time $\tau$ is less than the coherence time $\tau_c$ of the source. For $A=A_c$ and $\tau=\tau_c$, Equation 1 yields the fluctuations within one phase space cell whose volume in configuration space is $A_c c \tau_c$, where c is the speed of light.

The first term, $<n>$, in the righthand side of Eq. 1, is the shot-noise and the second term, $<n>^2$, is the excess photon noise due to the beating of various Fourier components within the broadband spectrum of the light source. Since the light source power at the photodetector is normally greater than 1.0 $\mu$w, the largest contributor to RIN will be the excess noise term, $<n>^2$.

If the broadband radiation is unpolarized and is observed over a detector area A during the time $\tau$, it will occupy a volume of $Ac\tau$. It follows then that there will be m phase space cells contained in this volume, such that $$m = pA\tau/(A_c \tau_c) \tag{2}$$

where p is the number of polarization states (p=2 for unpolarized light; p=1 for polarized light). Variable p in Equation 2 takes into account the lack of correlation between photons with different polarization states. Typically, m is much greater than one, since $\tau$ is much greater than $\tau_c$ and A is greater than $A_c$. Since the fluctuations in noise among the m phase space cells are uncorrelated and $<n>/m$ electrons are emitted from each cell, the total mean square fluctuations are defined by $$<\Delta n^2> = m[<n>/m + (<n>/m)^2] \tag{3}$$

and, therefore, $$<\Delta n^2> = <n> + <n>^2/m \tag{4}$$

Substituting for m using Equation 2, $$<\Delta n^2> = <n> + A_c \tau_c <n>^2/(pA\tau) \tag{5}$$

Since the coherence time of the light source $\tau_c$ is inversely proportional to the optical bandwidth $B_1$ and the observation time $\tau$ is inversely proportional to the detector bandwidth $B_2$, the ratio of $B_1$ to $B_2$ can be substituted for the ratio of $\tau$ to $\tau_c$ in Equation 2:

$$m = pA\tau/(A_c \tau_c) = pAB_1/(A_c B_2) \tag{6}$$

and $$<\Delta n^2> = <n> + A_c B_2 <n>^2/(pAB_1) \tag{7}$$

where $A_c/A \approx 1$ for a Gaussian beam.

Substituting the photocurrent I of the photodetector for the number n of electrons emitted, the photocurrent fluctuation is defined by $$<\Delta I^2> = 2eB_2<I> + 2B_2<I>^2/(p\Delta\upsilon) \tag{8}$$

where $<I>$ is the mean detected photocurrent, e is the electron charge, $\Delta\upsilon$ is the optical linewidth defined by $$\Delta\upsilon = [\int P(\upsilon)d\upsilon]^2 / [\int P^2(\upsilon)d\upsilon] \tag{9}$$

and $P(\upsilon)$ is the power-spectral-density of the light source.

The relative intensity noise (RIN) can be expressed as the ratio of the photocurrent fluctuation to the product of the mean square of the D.C. current, $<I>^2$, and the detector bandwidth $B_2$. Thus $$RIN = <\Delta I^2>/(<I>^2 B_2) = 2/(p\Delta\upsilon) \tag{10}$$

From Eq. 10, it can be seen that the RIN of polarized light, where p=1, is twice that of unpolarized light (p=2). Similarly, the contribution of RIN to the random walk coefficient is dependent on whether the detected light is polarized. Therefore, the random walk coefficient will be significantly reduced when the light is not polarized.

The gyroscopes previously noted above utilize linearly polarized light for sensing rotational rate and therefore exhibit the RIN characteristics attendant with a system using a single polarization. It would be desirable to reduce the random walk coefficient of noise in fiber optic gyroscopes without sacrificing their accuracy.

BRIEF DESCRIPTION OF DRAWINGS

A more complete understanding of the present invention, as well as other objects and advantages thereof not enumerated herein, will become apparent upon consideration of the following detailed description and the accompanying drawings, wherein.

DESCRIPTION OF THE INVENTION

Figure 1:
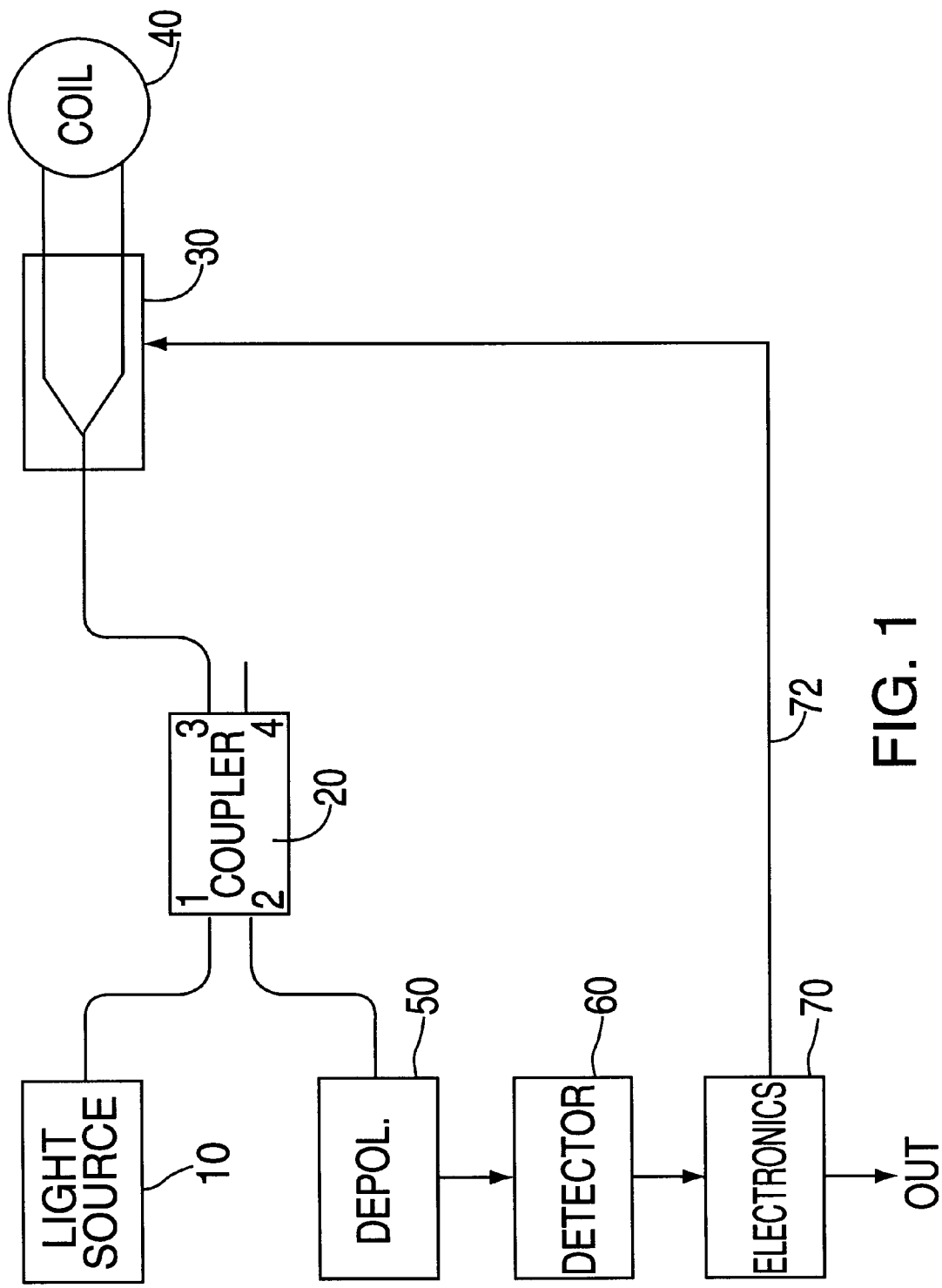
FIG. 1 is a schematic block diagram of a gyroscope with reduced relative intensity noise and random walk error.

By depolarizing the light energy output of the fiber optic sensing coil of the fiber optic gyroscope or by combining this energy with the unmodulated light energy of the orthogonal polarization, a 3 db reduction in RIN can be achieved. A closed-loop interferometric fiber optic gyroscope that accomplishes this by depolarizing the output of the coil is shown in FIG. 1. The curved interconnecting lines denote optical interconnections.

The gyroscope illustrated in FIG. 1 has a broadband light source 10, which can be a laser diode, a light emitting diode (LED), a super luminescent diode (SLD), or a superfluorescent fiber source (SFS). The light source 10 is normally unpolarized, producing light waves having two independent polarization states, defined as the p-state and the s-state (orthogonal to the p-state), and operates at some specified mean wavelength which dictates the operating wavelength of the other components in the fiber optic gyroscope. The light source 10 preferably generates sufficient optical power so that the largest component of random walk error is the excess or RIN-dominated noise to afford a significant reduction of gyroscope noise.

The output of the light source 10 provides unpolarized light to port 1 of a four-port bidirectional coupler 20. The bidirectional coupler 20 can be a 2×2 polarization-maintaining (PM), single-mode (SM) coupler with an internal coupling ratio of approximately 50/50. Light energy entering port 1 exits the bidirectional coupler 20 via ports 3 and 4 in approximately equal amplitudes. Similarly, light energy entering the coupler at port 3 would exit the coupler at ports 1 and 2, again in approximately equal amplitudes.

The light appearing at port 3 of the coupler 20 is provided to a splitter/modulator 30 which can be incorporated in an optional integrated optics chip, which accepts one polarization component, e.g., the s-state polarization component, and discards the other component, e.g., the p-state polarization component. The splitter/modulator 30 splits the s-state polarization component light energy into two beams and provides them to a fiber optic sensing coil 40. After travelling through the fiber optic sense coil 40, the two beams recombine in the splitter/modulator 30 and travel back through the coupler 20, entering at port 3 and leaving through ports 1 and 2 of the bidirectional coupler 20. The energy leaving port 1 will travel back to the light source 10 and can be ignored.

The output of port 2 of the coupler 20 is one-half of the input to port 3, i.e. one-half of the reconstructed s-state polarization component. It passes through a depolarizer 50, which produces an unpolarized output with two uncorrelated polarization states. This unpolarized light energy in turn is provided to a photodetector 60. A semiconductor device, such as an avalanche-type or p-i-n diode can serve as the photodetector 60. The output of the photodetector 60 is provided to the gyroscope electronics 70 that generates an output signal, closing the loop of the gyroscope by providing a feedback signal 72 to the splitter/modulator 30. It should be understood that although the gyroscope electronics 70 produces an angular rate-indicative output, the feedback signal is also indicative of angular rate.

Figure 2:
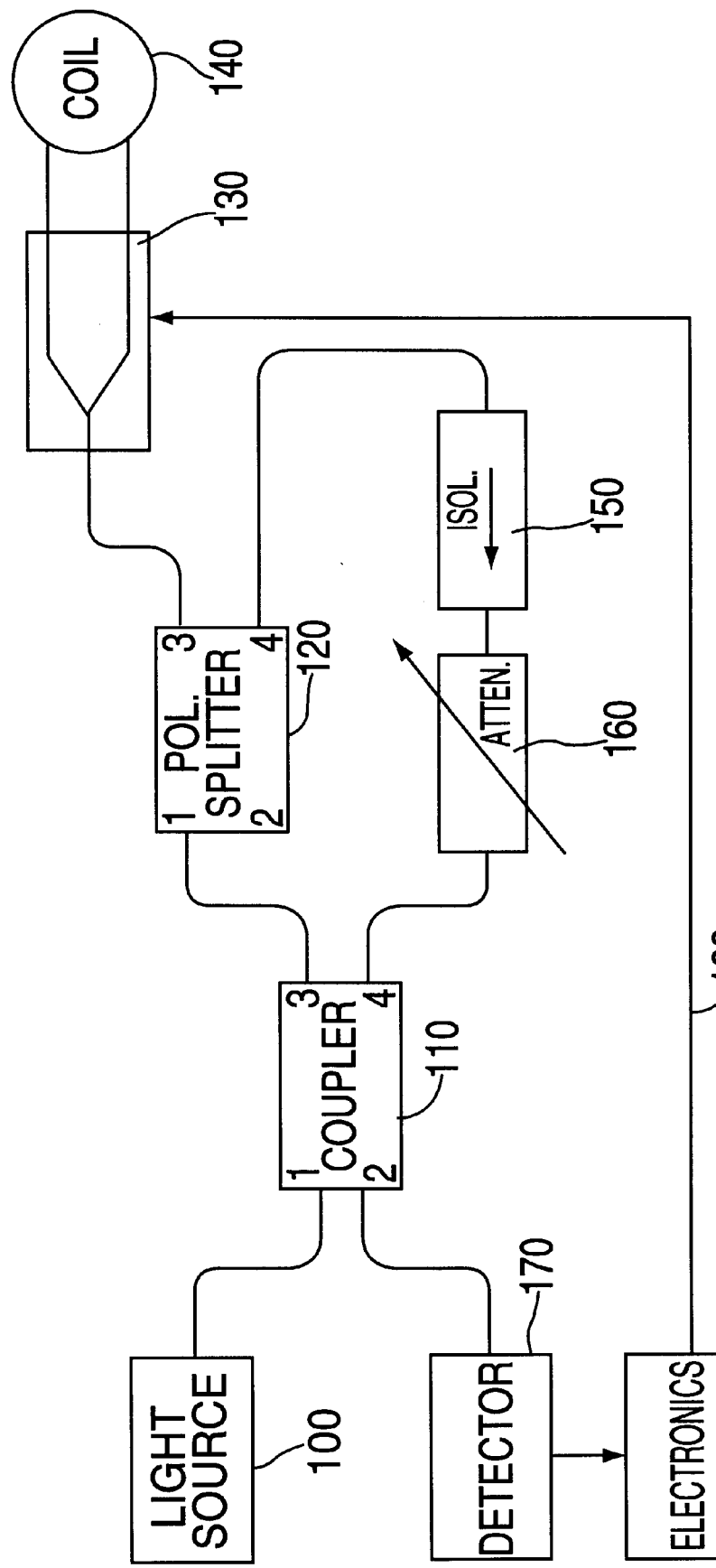
FIG. 2 is a schematic block diagram of an alternative gyroscope with reduced relative intensity noise.

A First Alternative Arrangement—FIG. 2

A closed-loop interferometric fiber optic gyroscope that accomplishes a 3 db reduction in RIN by combining the output of the fiber optic coil with the unmodulated light energy of the orthogonal polarization is shown in FIG. 2. Again, the gyroscope has an unpolarized light source 100 generating light having two independent polarization states.

The output of the light source 100 provides unpolarized light to port 1 of a four-port bidirectional coupler 110. The bidirectional coupler 110 can be a 2×2 polarization-maintaining (PM), single-mode (SM) coupler with an internal coupling ratio of approximately 50/50. Light energy exits the bidirectional coupler 110 via ports 3 and 4.

The light energy from the bidirectional coupler 110 is provided to port 1 of a four-port polarization splitter 120, a 2×2 polarization-dependent coupler/splitter. One polarization component, e.g., the p-polarization state, is coupled from port 1 to port 4 and from port 3 to port 2, while the other component, the s-polarization state, is coupled from port 1 to port 3 and from port 4 to port 2. If the light source 100 provides an unpolarized output, fifty percent of the light, the s-polarization state, will travel to port 3 and fifty percent, the p-polarization state, will be provided to port 4.

The s-state polarization component appearing at port 3 of the polarization splitter 120 is provided to a splitter/modulator 130 which can be incorporated in an optional integrated optics chip, which splits the light energy into two beams and provides them to a fiber optic sensing coil 140. After travelling through the fiber optic sense coil 140, the two beams recombine in the splitter/modulator 130 and travel back through the polarization splitter 120, entering at port 3 and leaving through port 1, to port 3 of the bidirectional coupler 110.

The p-state polarization component appearing at port 4 of the polarization splitter 120 is coupled through an optical isolator 150 and a variable optical attenuator 160, such as a Mach-Zehnder interferometer, to port 4 of the bidirectional coupler 110. The isolator 150 prevents light energy from the light source 100 leaving port 4 of the bidirectional coupler 110 from entering the polarization splitter 120.

The s- and p-state polarization components combine in the bidirectional coupler 110 and emerge at port 2 (and port 1) of the coupler 110. The combined light energy is then provided to a photodetector 170. Again, the photodetector 170 can be a semiconductor device such as an avalanche-type or p-i-n diode. The output of the photodetector 170 is provided to the gyroscope electronics 180 to generate an output signal, closing the loop of the gyroscope by providing a feedback signal 182 to the splitter/modulator 130.

Figure 3:
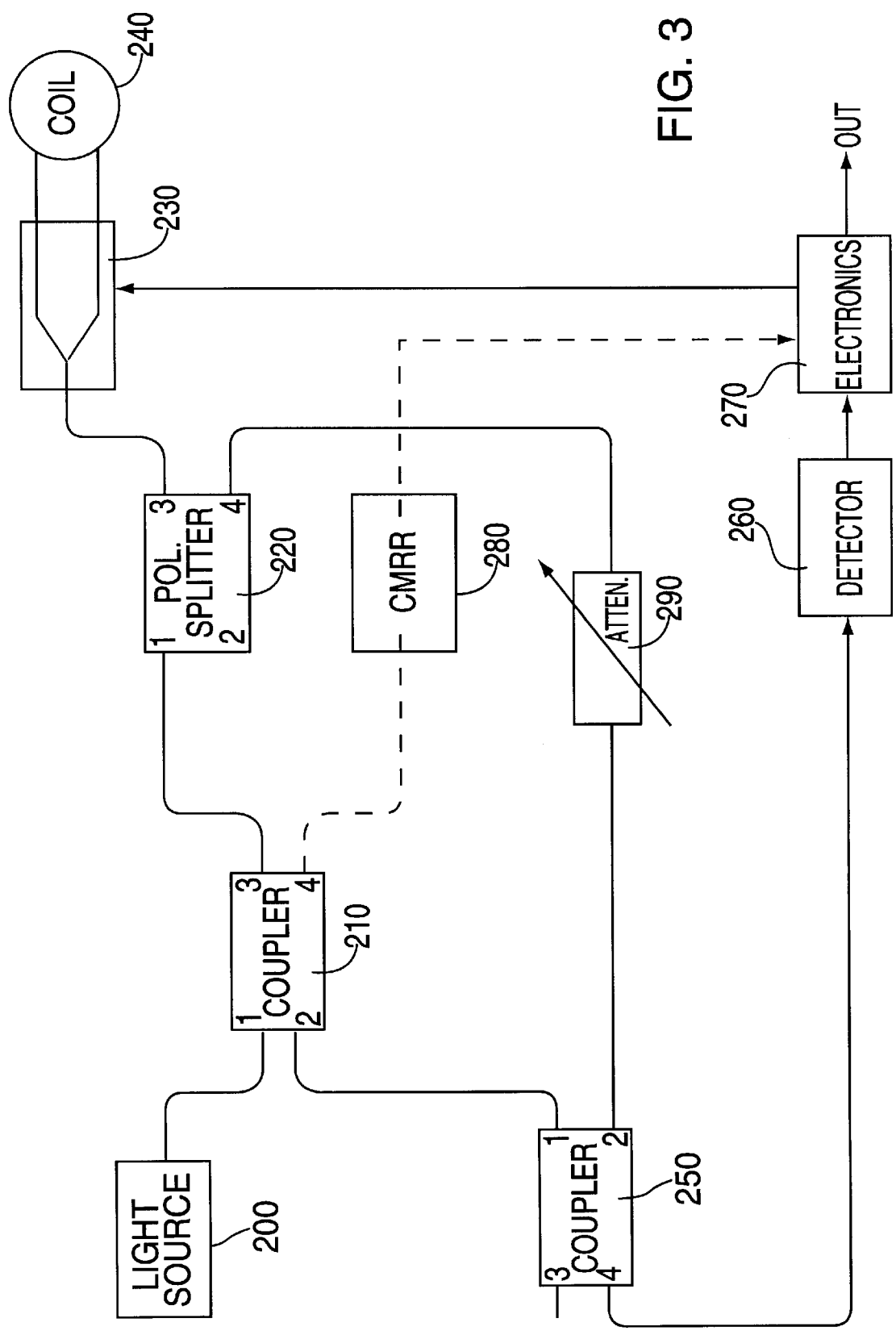
FIG. 3 is a schematic block diagram of another alternative gyroscope with reduced relative intensity noise.

Another Alternative Arrangement—FIG. 3

The gyroscope of FIG. 3 uses a second bidirectional coupler. In the gyroscope of FIG. 3, a light source 200 provides unpolarized light to port 1 of a first bidirectional coupler 210. Light energy exits the coupler 210 via port 3 and enters port 1 of a polarization splitter 220 to provide one polarization component, e.g., the s-state polarization component, at port 3 and the other component, e.g., the p-state polarization component, at port 4.

The s-state polarization component is routed to a splitter/modulator 230 and a fiber optic sensing coil 240. On the return, the two beams recombine and travel back through the polarization splitter 220 and through the first bidirectional coupler 210. One-half of this s-state component, exiting through port 2 of the coupler 210 (the other half exiting through port 1 of the first bidirectional coupler 210) and the p-state component appearing at port 4 of the polarization splitter 220 are provided to ports 1 and 2, respectively, of a second bidirectional coupler 250.

The s- and p-state polarization components combine in the bidirectional coupler 250; the combined components emerge at port 4 (and port 3) and are provided to a photodetector 260. The output of the photodetector 260 is provided to the gyroscope electronics 270 to generate an output signal and close the loop of the gyroscope by providing a feedback signal 272 to the splitter/modulator 230.

If desired, common mode noise reduction can be provided. The unused output at port 4 of the first bidirectional coupler 210 can be provided to a common-mode noise detector 280. The output generated by the common-mode noise detector 280 is in turn provided to the gyroscope electronics 270. A commercially-available module matched to the photodetector 260 can be employed as the common-mode noise detector 280.

As a further refinement, a variable optical attenuator 290 can be placed in the line between port 4 of the polarization splitter 220 and port 2 of the second bidirectional coupler 250 to balance the levels of the optical energy provided to tile inputs to the coupler 250.

Figure 4:
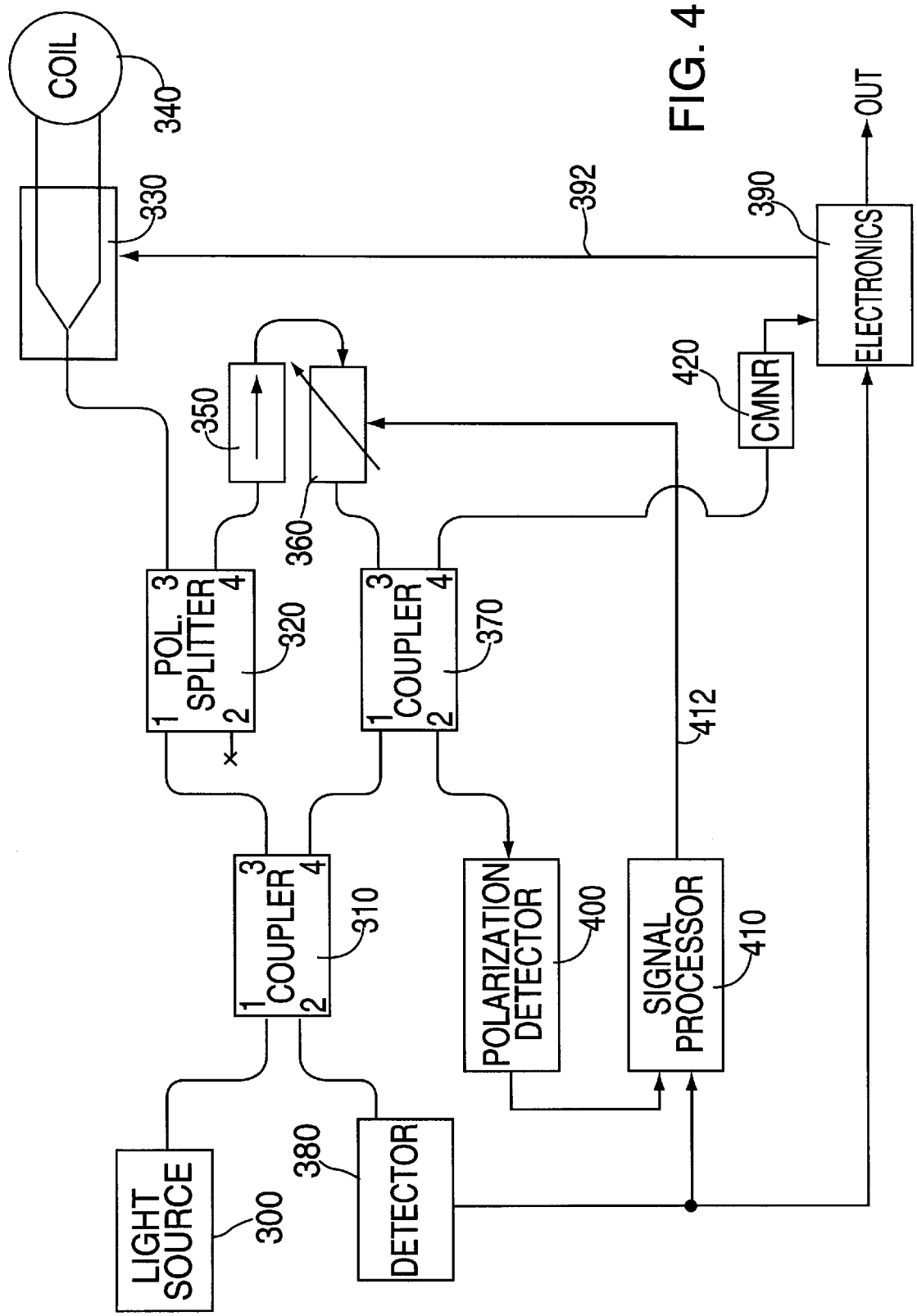
FIG. 4 is a schematic block diagram of an alternative gyroscope with reduced relative intensity noise having an optical power balancing capability.

Polarization Adjustment—FIG. 4

The arrangement of the gyroscope shown in FIG. 4 permits optical power balancing of the two polarization components. A light source 300 provides unpolarized light to port 1 of a first bidirectional coupler 310. Light energy exits the coupler 310 via port 3 and enters port 1 of a polarization splitter 320 to separate the light energy into an s-state polarization component at port 3 for example and a p-state polarization component at the other port, port 4.

The s-state polarization component is routed to a splitter/modulator 330 and, after having been split into two beams, a fiber optic sensing coil 340. On the return, the two beams recombine and travel back through the polarization splitter 320 to port 3 of the first bidirectional coupler 310.

The p-state polarization component appearing at port 4 of the polarization splitter 320 is coupled through an isolator 350, a variable optical attenuator 360, and a second bidirectional coupler 370 to port 4 of the first bidirectional coupler 310. The isolator 350 prevents light energy from the light source 300 leaving port 4 of the first bidirectional coupler 310 from entering the polarization splitter 320.

The s- and p-state polarization components combine in the first bidirectional coupler 310 and emerge at port 2 (and port 1). The combined light energy is then provided to a photodetector 380. The output of the photodetector 380 is provided to the gyroscope electronics 390 to generate an output signal and close the loop of the gyroscope by providing a feedback signal 392 to the splitter/modulator 330.

A polarization adjustment detector 400, receiving the p-state polarization component appearing at port 2 of the second bidirectional coupler 370, enables the gyroscope to balance the s- and p-state polarization components. The output of the polarization adjustment detector 400 and the gyroscope photodetector 380 are provided to a polarization signal processor 410 which compares the relative levels of the two components and generates an error signal 412 that controls the variable optical attenuator 360.

Again, if desired, common mode noise reduction can be provided. The unused optical output at port 4 of the second bidirectional coupler 370 can be provided to a common-mode noise detector 420. The output generated by the common-mode noise detector 420 is in turn provided to the gyroscope electronics 390.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An apparatus, comprising:
   a broadband light source for generating an unpolarized light wave output;
   means for polarizing the light wave output into orthogonal polarization states;
   means for modulating one polarization state of the light wave output; and
   means for depolarizing the modulated light wave output.

2. An apparatus, comprising:
   a broadband light source for generating an unpolarized light wave output;
   polarization-splitting means for splitting at least a portion of the light wave output into first and second polarization components, one orthogonally oriented with respect to the other;
   means for modulating one polarization component of the light wave output: and
   means for combining the modulated polarization component with the other polarization of the light wave output.

3. An apparatus as set forth in claim 2, where the means for modulating comprises a sensing coil and splitter/modulator means for splitting one of the polarization components of the light wave output into two beams, and for providing the two beams to the sensing coil and receiving the beams from the sensing coil, modulating one of the beams, and recombining the two beams.

4. A fiber optic gyroscope for sensing angular rate, the gyroscope having a fiber optic sensing coil for carrying light beams in opposing directions, comprising:
   a broadband light source for generating a light output;
   polarization splitting means for splitting at least a portion of the light output into first and second components, one orthogonally oriented with respect to the other;
   splitter/modulator means for splitting one of the components of the light output into two beams, providing the two beams to the sensing coil and receiving the beams from the sensing coil, modulating one of the beams, and recombining the two beams to provide an output;
   coupler means for combining the output of the splitter/modulator means and the other of the components of the light output;
   detection means, responsive to the coupler means, for detecting the recombined beams and providing an output proportional to the magnitude of the recombined beams; and
   processing means for generating a feedback signal in response to the output of the detector and providing the feedback signal to splitter/modulator.

5. A fiber optic gyroscope as set forth in claim 4, further comprising means, responsive to the light output, for detecting common mode noise.

6. A fiber optic gyroscope as set forth in claim 4, further comprising polarization adjustment means, responsive to the other of the components of the light output, for balancing the first and second components.

7. A method, comprising the steps of:
   generating an unpolarized light wave output from a broadband light source;
   polarizing the light wave output into orthogonal polarization states;
   modulating one polarization state of the light wave output; and
   depolarizing the modulated light wave output.

8. A method, comprising the steps of:
   generating an unpolarized light wave output from a broadband light source;
   splitting at least a portion of the light wave output into first and second polarization components, one orthogonally oriented with respect to the other;

modulating one polarization component of the light wave output; and combining the modulated polarization with the other polarization of the light wave output.

9. A method as set forth in claim 8, where step of modulating one polarization component of the light wave output includes the steps of splitting one of the polarization components into two beams, providing the two beams to a fiber optic sensing coil and receiving the beams from the sensing coil, modulating one of the beams, and recombining the two beams.

10. A method for sensing angular rate with a fiber optic gyroscope, the gyroscope having a fiber optic sensing coil for carrying light beams in opposing directions, comprising the steps of:

generating a broadband light output;

splitting at least a portion of the light output into first and second components, one orthogonally oriented with respect to the other;

splitting one of the components of the light output into two beams, providing the two beams to the sensing coil and receiving the beams from the sensing coil modulating one of the beams, and recombining the two beams to provide an output:

combining the output and the other of the components of the light output;

in response to the step of combining, detecting the recombined beams and providing an output proportional to the magnitude of the recombined beams; and in response to the step of detecting, generating a feedback signal.

11. A method as set forth in claim 10, further comprising the step of detecting common mode noise in response to the light output.

12. A method as set forth in claim 10, further comprising the step for balancing the first and second components, in response to the other of the components of the light output.

* * * * *

UNITED STATES PATENT AND TRADEMARK OFFICE
CERTIFICATE OF CORRECTION

PATENT NO. : 5,898,496

DATED : April 27, 1999

INVENTOR(S) : Sidney X. Huang et al.

It is certified that error appears in the above-identified patent and that said Letters Patent is hereby corrected as shown below:

ON THE TITLE PAGE:

Add --Item [73] Assignee:  AlliedSignal Inc. -- after item [76].

Signed and Sealed this

Eighth Day of August, 2000

Attest:

Q. TODD DICKINSON

*Attesting Officer*    *Director of Patents and Trademarks*